Patented July 14, 1953

2,645,580

UNITED STATES PATENT OFFICE 2,645,580

METHOD OF PRODUCING A FLUFFY CHOCOLATE CONFECTION

Paul E. Schultz, Wichita, Kans.

No Drawing. Application May 25, 1951, Serial No. 228,367

2 Claims. (Cl. 99—134)

The invention herein disclosed relates to the manufacture of chocolate or chocolate-like confections.

The desirability of a chocolate confection of fluffy characteristics has been appreciated but attempts to create such a product have not been successful.

These attempts have involved methods of beating or whipping.

Dairy products and mixtures such as mayonnaise and salad dressings can be whipped by conventional methods and with gases such as carbon dioxide and nitrous oxide.

This is so because such mixtures contain a colloidal material which in the presence of water makes it possible to disperse the water phase with a gaseous phase or to disperse water, gaseous and fat phases together.

With chocolate or chocolate-like materials, however, there is no known colloid to make it possible to whip the gaseous phase into the chocolate.

With whipping cream the colloid is the protein in the milk and with mayonnaise the colloid is the protein in the egg whites. These and similar materials, however, are not effective with chocolate.

If water is added to chocolate the mixture can no longer be considered chocolate.

Endeavoring to whip chocolate is like trying to whip pure water or oil. Water can be whipped on addition of soaps or certain proteins, but no colloids are known to make it possible to whip oil, and chocolate appears to be in this same classification.

The present invention involves the discovery that by using nitrous oxide under fairly high pressure it is possible to disperse the gaseous phase in molten chocolate and chocolate-like materials to produce a highly desirable fluffy product similar to what a whipped chocolate should be if it could be whipped.

The nitrous oxide does not produce any undesirable flavor such as would result from the use of carbon dioxide and is soluble enough to be fully practical, as distinguished from other inert gases such as nitrogen.

The chocolate, unlike other mixtures such as mentioned above and which contain a good percentage of water in which the gas can dissolve, contains only fat for the gas to dissolve in.

The nitrous oxide, under high pressure and with mechanical agitation, dissolves in the chocolate, producing, as released, a fluffy chocolate confection of delicious and other highly desirable characteristics.

The invention is not limited to chocolate alone. The process works as well with cocoa, edible oil, sugar mixtures of the type commonly known as substitute chocolate.

Suitable chocolate mixtures, for example, may be considered chocolate with 20–40% cocoa butter, and a substitute chocolate as edible oil 20–40%, cocoa powder 5–20%, sugars 70–35%.

Included in such mixtures also are the fat filled bonbon coatings and confections such as toffees and caramels.

The invention is based on the fact that nitrous oxide is soluble in fats, under pressure, and is primarily concerned with confections which do not lend themselves to whipping by methods commonly used in the art.

In a preferred operation nitrous oxide is injected into the molten chocolate in a pressure vessel, under pressure from 300 to 1,000 pounds per square inch, while the mixture is mechanically agitated. It has been found best to mechanically agitate, under pressure, for at least five minutes to insure solution of the gas. Longer mechanical agitation under lower pressures will yield generally similar results.

After the gases are thoroughly dissolved the mixture is discharged from the pressure vessel, coming out as an expanded product of fine, fluffy consistency. As it cools and hardens the dispersion may be shaped or molded in any desired form and in the size of product desired.

The fluffy confection, in addition to having better flavor and edibility, is lighter in weight and, for the same size, contains less material than comparable solid products. In addition thus to being a new and better product, it actually is less expensive in material costs and because of its better end quality, permits use of less expensive components.

What is claimed is:

1. The herein disclosed method of producing a chocolate confection of solid form but fluffy structure, comprising dispersing nitrous oxide gas under pressure in a confined body of warm, molten chocolate confection while mechanically agitating said molten confection and then releasing the mechanically agitated molten mixture containing the dispersed and mechanically distributed gas dissolved therein and allowing the mixture as it is released to expand under pressure of the gas, into fluffy condition and cooling and hardening the fluffed molten mixture to an expanded, fluffy but solid condition.

2. The herein disclosed method of producing a chocolate confection of solid form but fluffy structure, comprising dispersing nitrous oxide gas under pressure up to 1,000 pounds per square inch in a confined body of warm, molten chocolate confection while mechanically agitating said molten confection for a period on the order of five minutes to insure solution of the gas in the confection, and then releasing the mechanically agitated molten mixture containing the dispersed and mechanically distributed gas dissolved therein and allowing the mixture as it is released to expand under pressure of the gas, into fluffy condition and cooling and hardening the fluffed molten mixture to an expanded, fluffy but solid condition.

PAUL E. SCHULTZ.

References Cited in the file of this patent

UNITED STATES PATENTS

| Number | Name | Date |
| --- | --- | --- |
| 1,758,602 | Head | May 13, 1930 |
| 2,120,297 | Reinecke | June 14, 1938 |
| 2,294,172 | Getz | Aug. 25, 1942 |
| 2,342,972 | Roy et al. | Feb. 29, 1944 |